Figure 1:
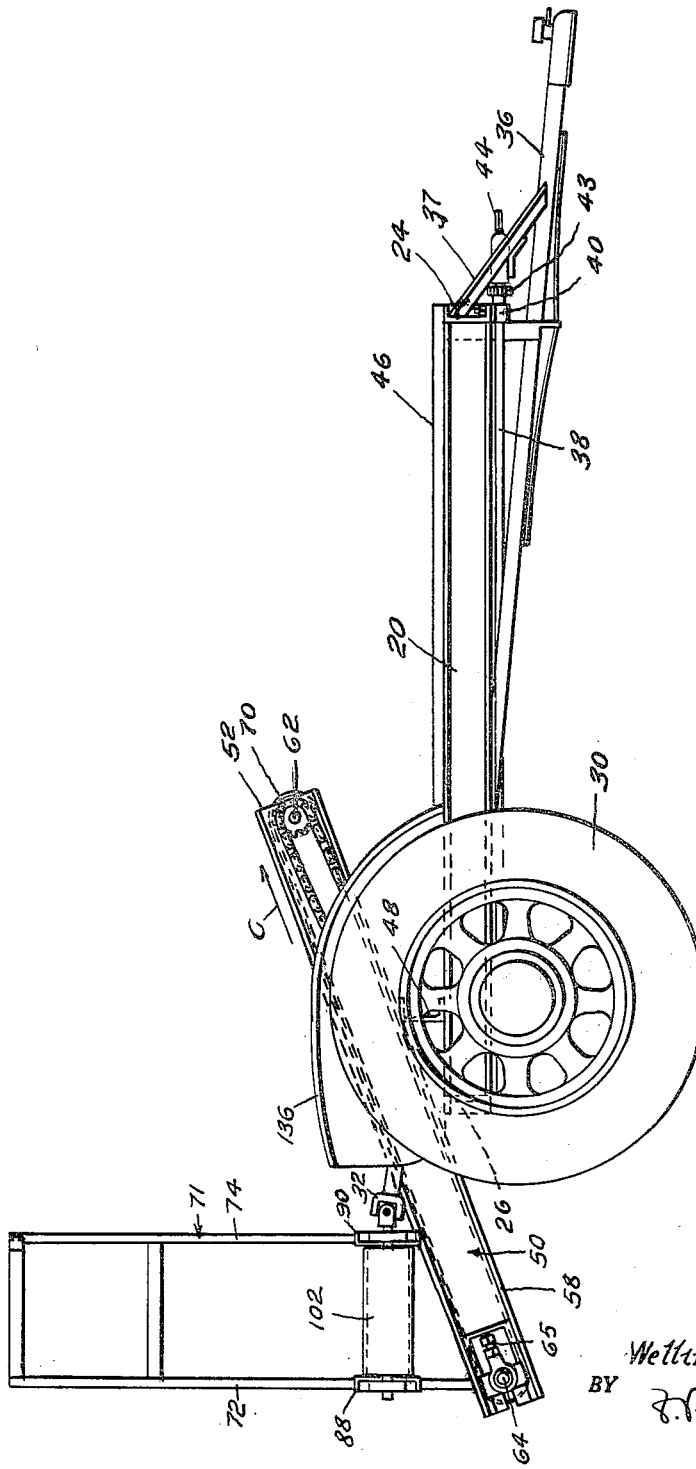

Dec. 1, 1964     W. W. PORTER     3,159,292
HARVESTER
Original Filed Sept. 11, 1956     4 Sheets-Sheet 2

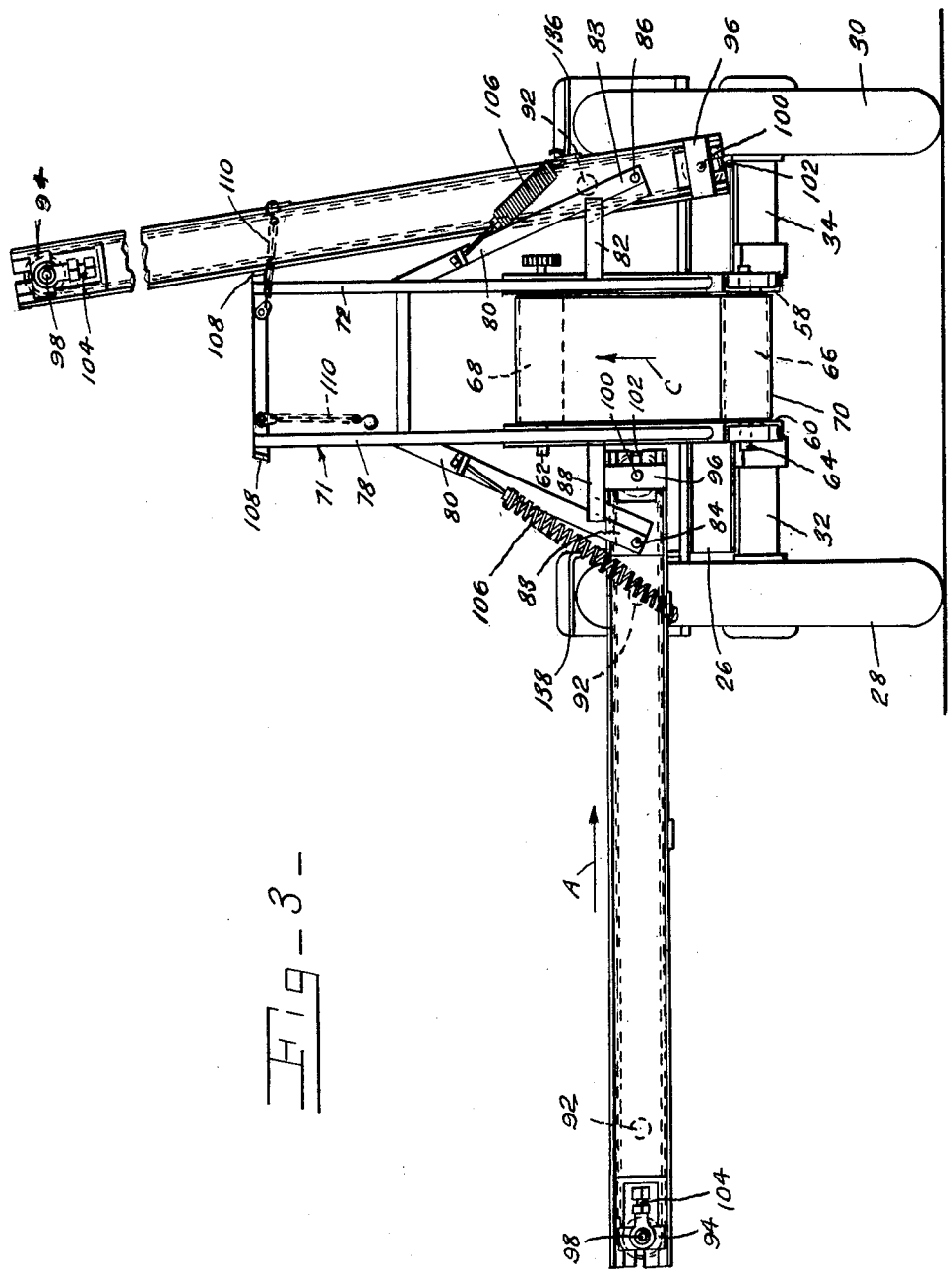

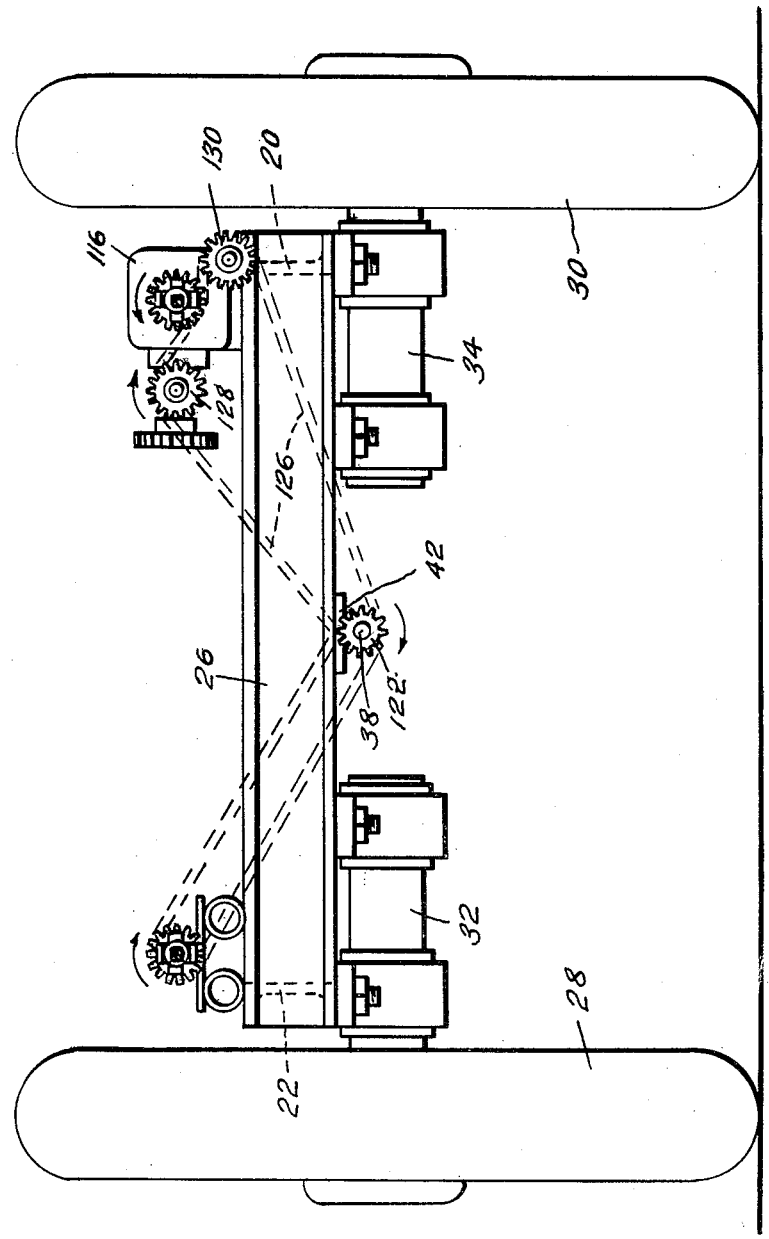

United States Patent Office 3,159,292
Patented Dec. 1, 1964

3,159,292
HARVESTER
Wellington W. Porter, R.D. 2, Waterloo, N.Y.
Continuation of application Ser. No. 609,207, Sept. 11, 1956. This application Feb. 14, 1962, Ser. No. 174,354
1 Claim. (Cl. 214—83.1)

This invention relates to a conveyor or harvester for the gathering of broccoli, cucumbers, and similar crops.

In the harvesting of broccoli, cucumbers, and the like, it has been the practice for individuals to harvest the crop by cutting or picking and placing the same manually in individual containers such as crates or baskets. Such containers as they become filled are heavy to move as the harvesting progresses down the field. The individual picker is hampered in picking by having to advance a container with the operation.

The present invention is directed to providing laterally extending conveyors which may be moved down a field along the rows of plants or vines, and upon which the pickers may conveniently place the crop as soon as it is picked or cut. The conveyors are located at a convenient height to clear the vines and at a height convenient to receive the harvest. The conveyors discharge into an inclined forwardly extending conveyor adapted to in turn discharge over an enlarged platform upon which may be stacked a large number of empty or filled crates. The empty crates are positioned beneath the conveyor discharge end of such conveyor in sequence as each crate is filled and removed from beneath the conveyor. The conveyors handle the crop with minimum drop, free from damaging effect, and as soon as the platform becomes loaded with filled crates, the harvester is stopped, unloaded and replenished with empty crates.

The features of the invention, as indicated above, and other objects will appear more fully hereinafter from the following detailed description when taken in conjunction with the drawing. It is expressly understood that the drawings are employed for purposes of illustration only and are not designed as a definition of the limits of the invention, reference being had for this purpose to the appended claim.

Figure 2:
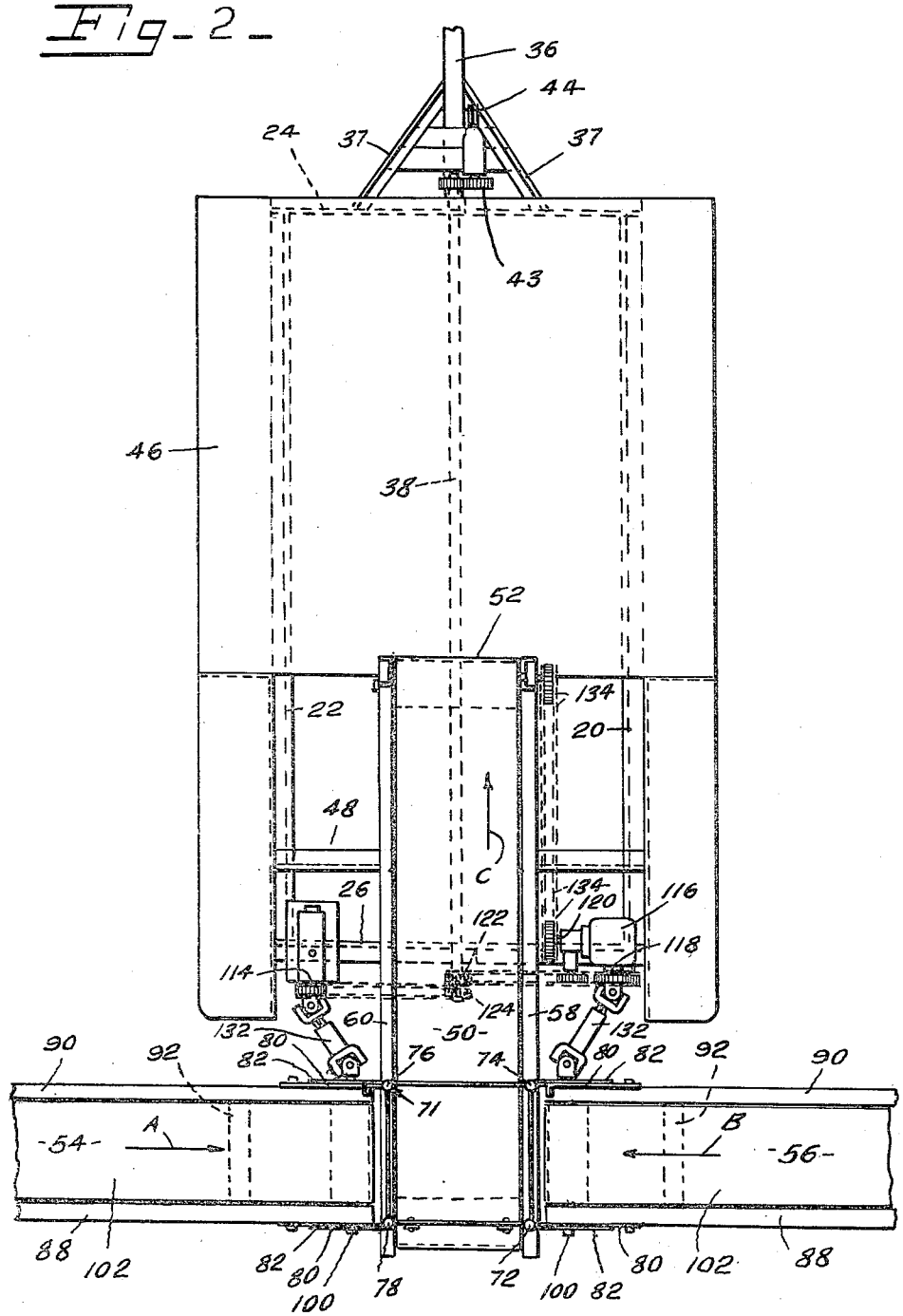

In the drawings, wherein like reference characters indicate like parts:

FIGURE 1 is a side elevational view of the harvester;
FIGURE 2 is a top plan view;
FIGURE 3 is a rear end elevation with one lateral conveyor elevated and the other extending horizontally; and
FIGURE 4 is an enlarged rear end elevation, with the conveyors removed to show the gearing.

In FIGURES 1 and 2, there is shown a rectangular frame comprising spaced side channel members 20 and 22, and forward and rearward transverse members 24 and 26. The frame is supported on spaced wheels 28 and 30 and axle members 32 and 34 disposed beneath the frame. The wheels are of a diameter and spaced so as to support the frame above the height of and straddle the rows of broccoli or cucumber vines.

The frame is provided with a drawbar 36, rigidly braced to the frame as at 37, and adapted to be coupled to a tractor to maintain the frame horizontal. Extending lengthwise beneath the frame is a power shaft 38 journalled as at 40 and 42, the shaft being provided with offset gearing 43 at its forward end to provide an offset extension 44 adapted to be coupled with a power takeoff from the tractor. The forward portion of the frame is covered by a loading deck 46.

A transverse channel member 48 extends across the frame members 20 and 22 and together with the member 26 provides support for an inclined conveyor assembly 50, the forward end 52 of which extends to the platform and is disposed at a suitable height thereabove so that the conveyor may discharge into boxes or crates which may be placed below the discharge end 52. The rear end of the conveyor 50 trails behind the frame and forms a support for lateral conveyors 54 and 56.

The conveyor 50 comprises spaced side channels 58 and 60 mounted on the cross channels 48 and 26. The conveyors at either end is provided with transverse shafts 62 and 64, the latter being adjustable as at 65 to provide suitable tension for the conveyor belt. Both shafts are provided with rolls 66 and 68 around which a conveyor belt 70 extends.

An upstanding rectangular frame 71 comprising corner posts 72, 74, 76 and 78 is mounted on the end of the conveyor channels 58 and 60. From each post of the frame extend triangular bracing composed of an inclined member 80 and a laterally extending member 82. Such bracing providing perches 83 for the pivotal mounting as at 84 and 86, of the transverse or lateral conveyors 54 or 56, so that such conveyors may extend laterally and horizontally or be swung to a substantially vertical position as shown in FIGURE 3.

Each of the conveyors 54 and 56 may be formed of light spaced channels 88 and 90, or other suitable structure, such channels being tied together by transverse members as at 92. At each end of each of the channels, bearing blocks 94 and 96 are provided, in which are journalled shafts 98 and 100, having rolls for supporting a conveyor belt 102. The bearing block 94 may be provided with a belt tensioning adjustment 104. The conveyors 54 and 56 are pivoted as at 84 and 86 between their respective perches 83, extending from the left and the right of the tower frame 71. The bearing blocks 96 on either channel project outwardly beyond the channel to provide an abutment adapted to engage the members 82 of the respective perch frames 83 and thereby support the conveyors in a horizontal position in the manner of a cantilever. Suitable springs 106 extending from each conveyor side member to a corresponding perch tend to counter-balance the conveyor frame so as to render it more easily moved from the horizontal position to the vertical position.

The tower 71 is provided with stops 108 and chains 110 to position and retain the conveyors in substantially vertical position.

Mounted on the rear of the frame, at one side is a bearing 112 in which is journalled a stub shaft 114. On the other side is a mitre gear box 116 from which a stub shaft 118 projects rearwardly and a second stub shaft 120 projects laterally.

The rear end of the drive shaft 38 is provided with sprockets 122 and 124 and a chain drive to stub shaft 114 is provided from sprocket 122. A chain drive 126 having reverse drive means employing idlers 128 and 130 drives the stub shaft 118 and in turn drives the stub shaft 120 through the mitre gear box 116. The stub shafts 114 and 118 are each connected by flexible shafting such as universal joint mechanisms 132 to the respective shafts 100 of the conveyors 54 and 56. The stub shaft 120 drives the shaft 62 of the conveyor 50 through the sprocket and chain drive 134. By the arrangement shown, it will be seen that the conveyors 54 and 56 operate in the direction of the arrows A and B, and discharge upon the conveyor 50 which moves in the direction of arrow C.

The universal joint mechanisms permit the conveyors 54 and 56 to swing to the vertical position without uncoupling the drive, although it will be understood that when such conveyors are so elevated, the power applied to the shaft 38 from the tractor will be declutched, at the tractor.

Suitable guards 136 and 138 are disposed over the wheels, and sideboards on the forward sides of the conveyors 54 and 56 and both sides of the conveyor 50 above the conveyor belts may be added if desired as will be well understood in the art.

The apparatus thus provided enables a tractor to draw the harvester along the rows of broccoli or cucumber vines, etc., while a squad of workers follow along behind the conveyors 54 and 56. As the harvester progresses the workers cut or pick the crop to be harvested and deposit the same upon the conveyors. At the same time a rider on the platform of the harvester places a box under the forward end of the conveyor 50 and replaces such box as soon as it is filled with an empty box. The platform provides sufficient space for a supply of crates or boxes, both empty and full, and from time to time the harvester is stopped, the platform unloaded and the supply of empty crates is replenished. The squad of workers are thus relieved of having to manage with a basket or other receptacle as the crop is harvested, since the crop is merely cut or picked by them and thrown on the conveyors 54 and 56.

When the harvester is to be moved from one field to another, the lateral conveyors 54 and 56 are conveniently secured in the upward extending position so that the harvester may be moved from place to place without requiring undue clearance. Such lateral conveyors are quickly returned to the horizontal position for harvesting.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claim for a definition of the limits of the invention.

The application is a continuation of application 609,207, filed September 11, 1956, now abandoned.

What is claimed is:

A harvester comprising a frame, a single pair of spaced wheels mounted on aligned axles disposed beneath said frame, and adjacent the rear end thereof, said frame terminating short of the rear of said wheels, a rigid drawbar for attachment to a tractor extending from the forward end of the frame, a wide platform on said frame forward of said wheels, an inclined endless belt conveyor having inclined side members mounted on said frame between said wheels and having its lower end disposed rearwardly of and below said frame, and extending rearwardly of said wheels a substantial distance, and its forward upper end disposed above said platform and immediately forward of said wheels, a rectangular tower having corner posts mounted on and extending upwardly from the rear portion of said inclined conveyor side members, and being disposed entirely to the rear of said wheels and frame, laterally extending inclined braces extending from the upper portion of the respective opposite sides of said tower, and having forwardly horizontally extending pivotal mountings laterally spaced a substantial distance from the respective tower sides and disposed above the lower end of the inclined conveyor, two lateral conveyors each having endless belts, and side members pivotally mounted on the respective brace pivotal mountings on horizontal axes extending substantially parallel with the plane of said wheels, and above the lower end of said inclined conveyor, said axes being disposed outwardly of the inner ends of said lateral conveyors by a substantial distance, abutments affixed to the tower and connected with the braces on opposite sides of the tower for engaging the respective upper inner ends of the lateral conveyors to limit pivotal movement of said conveyors when swung from a vertical position along side said tower to horizontal positions, tension springs connected between the tower braces adjacent their upper ends and the respective lateral conveyors outward of the pivotal mountings to assist in pivotally moving said lateral conveyors from a horizontal position to a vertical position, each of said lateral conveyors having inner belt drive rolls disposed adjacent to and above said inclined conveyor when said lateral conveyors are in horizontal extended position, a drive spindle carried by said frame rearwardly of said axles for each of said lateral conveyor drive rollers and having a flexible universal joint connection therewith, and common means for driving said spindles in reverse direction and said inclined conveyor belt, said last named means including a drive shaft extending forwardly of the harvester and beneath the platform, and adapted to be coupled to a drive shaft of a towing tractor.

References Cited in the file of this patent
UNITED STATES PATENTS

| | | |
|---|---|---|
| 2,321,387 | Jackson | June 8, 1943 |
| 2,647,525 | Duda et al. | Aug. 4, 1953 |
| 2,861,703 | Inazimi et al. | Nov. 25, 1958 |